United States Patent
Oicherman et al.

(10) Patent No.: US 8,687,236 B2
(45) Date of Patent: Apr. 1, 2014

(54) INK RESTRICTION DETERMINATION

(75) Inventors: Boris Oicherman, Kiriat Tivon (IL); Doron Shaked, Tivon (IL); Matty Litvak, Netanya (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1344 days.

(21) Appl. No.: 12/357,581

(22) Filed: Jan. 22, 2009

(65) Prior Publication Data

US 2010/0182650 A1  Jul. 22, 2010

(51) Int. Cl.
*H04N 1/40* (2006.01)

(52) U.S. Cl.
USPC ......... 358/3.06; 358/1.9; 358/3.01; 358/3.02; 358/3.09; 358/3.1; 358/504; 358/518; 358/521; 358/522; 358/530; 358/534

(58) Field of Classification Search
CPC .............................. H04N 1/6041; H04N 1/605
USPC ......................................................... 358/3.06
See application file for complete search history.

(56) References Cited

U.S. PATENT DOCUMENTS

| | | | | |
|---|---|---|---|---|
| 5,592,312 | A * | 1/1997 | Noguchi | 358/525 |
| 5,748,330 | A * | 5/1998 | Wang et al. | 358/3.21 |
| 6,266,157 | B1 * | 7/2001 | Fan et al. | 358/1.9 |
| 7,724,392 | B2 * | 5/2010 | Kuhn et al. | 358/1.9 |
| 2004/0012817 | A1 * | 1/2004 | Brewington et al. | 358/3.06 |
| 2004/0095592 | A1 * | 5/2004 | Sanger | 358/1.9 |
| 2004/0125388 | A1 * | 7/2004 | Piatt et al. | 358/1.9 |
| 2005/0024654 | A1 * | 2/2005 | Yamada | 358/1.9 |
| 2005/0083540 | A1 * | 4/2005 | Hersch et al. | 358/1.9 |
| 2006/0221340 | A1 * | 10/2006 | Viturro et al. | 356/402 |
| 2007/0070467 | A1 * | 3/2007 | Wilms et al. | 358/518 |
| 2007/0076273 | A1 * | 4/2007 | Viturro et al. | 358/504 |
| 2007/0086026 | A1 * | 4/2007 | Huang et al. | 358/1.9 |
| 2007/0097390 | A1 * | 5/2007 | Huang et al. | 358/1.9 |
| 2007/0171442 | A1 * | 7/2007 | Granger | 358/1.9 |
| 2009/0040564 | A1 * | 2/2009 | Granger | 358/2.1 |
| 2009/0185208 | A1 * | 7/2009 | Yoshizawa et al. | 358/1.9 |
| 2010/0039657 | A1 * | 2/2010 | Wang et al. | 358/1.9 |
| 2010/0085586 | A1 * | 4/2010 | Tin | 358/1.9 |

OTHER PUBLICATIONS

Berns, Roy S. Billmeyer and Saltzman's principles of color technology. John Wiley and Sons, Inc, New York, USA, pp. 157-159 (2000).

* cited by examiner

*Primary Examiner* — Benjamin O Dulaney

(57) ABSTRACT

A method and apparatus as provided for determining, for an ink to be deposited on a substrate by a halftone inkjet printing process, a nominal coverage value (the 'ink restriction value'), that corresponds to an amount of ink sufficient to fully cover the area of the substrate to be printed. This determination is effected by measuring the reflectance of the printed substrate for a range of nominal coverage values, and then using an automatic processing arrangement to determine, from the change of measured reflectance with nominal coverage value, the nominal coverage value at which continuous tone behavior commences.

25 Claims, 3 Drawing Sheets

INK RESTRICTION DETERMINATION

FIELD OF THE INVENTION

The present invention relates to a method and apparatus for determining, for an ink to be deposited on a substrate by a halftone digital printing process, a nominal coverage value (the 'ink restriction value') that corresponds to an amount of ink sufficient to fully cover the area of the substrate to be printed.

BACKGROUND OF THE INVENTION

In digital printing, the ink layer is created by applying ink drops at the printed media (substrate). Typically, a commercial-quality digital printing system prints four inks: Cyan (C), Magenta (M), Yellow (Y) and Black (K) to create colours on a substrate, and employs halftoning. An image file to be printed is, for example, encoded as four values associated with each image pixel, each of these four values corresponding to a respective one of the four print colours (CYMK). The practical meaning of these values is the "nominal coverage", that is, the percentage of the substrate to be covered at the pixel location concerned. Thus, by way of example, the printing system might receive an image file in which a pixel had nominal coverage values of: C=50%, M=100%, Y=0%, K=0%; 0% values for Y and K means that for the pixel location concerned no Yellow or Black ink is to be printed, 100% for M means that the pixel location is to be covered completely by Magenta ink, and 50% for C means that half of the pixel location is to be covered by the Cyan ink.

The printing system translates the nominal coverage values into corresponding amounts of ink that is to be put on the substrate in the pixel location concerned. However, the required translation is not straightforward as it will depend on printing conditions. Determining an appropriate translation can be considered as two issues:
  how much ink needs to be printed to give 100% coverage?
  how much ink needs to be printed to give any particular coverage below 100%?

With regard to the issue of how much ink is needed to give 100% coverage, it can of course be determined experimentally that the printing system needs to print X picoliters of ink to cover fully the full substrate area associated with a pixel. However, if twice as much ink is printed, the area is also fully covered though now with a darker and more saturated shade of the same ink (due to the ink layer becoming thicker). Using excessive amounts of ink can give rise to a number of problems:
  Ink "bleeding": the ink leaks and flows beyond the area it was originally applied to, thus degrading the image quality;
  Ink drying: the ink remains wet long time after the printing;
  Colour control: the colour depends on the relative coverage of the ink, as well as on ink layer thickness—so, in the same image, the properties of halftone and continuous tone printing are combined. This is incompatible with the conventional halftone-based approach to colour control and results in uncontrollable colour behaviour.
  Excessive ink usage.

These problems give rise to the need of setting a restriction on the amount of applied ink. To this end, a determination is made as to the amount of ink which will result in coverage of the entire area but avoids/the above-noted problems. The nominal coverage value (called the "ink restriction" value) corresponding to this amount of ink, is then used to scale the nominal coverage values defined in the image file, into corrected coverage values. For example, if it is found that the amount of ink corresponding to 75% nominal coverage value provides enough ink to cover the full area, this ink restriction value of 75% is set as the maximum permissible value and all the original nominal coverage values are scaled down accordingly—see FIG. 1 of the accompanying drawings which illustrates a scaling curve (here a straight line) for converting between nominal and corrected coverage values, with 100% nominal coverage scaling to 75%.

Currently the ink restriction value is set either manually according to the results of visual examination, or semi-automatically with the use of density or Chroma/Lightness scales and some heuristics. These solutions are based mostly oil heuristics and experience, are not robust, subjective, and the results are often less than optimal.

With regard to the issue how much ink needs to be printed to give 50% coverage, this is not just the half of the amount of the 100% layer because of the effect called "dot gain": once an ink drop hits the substrate, it does not stay exactly in shape but spreads around. This effect is taken into account by a process called "linearization" which provides a further coverage-value scaling curve. For example, this curve may say that to achieve 50% coverage on the substrate, the printing system needs to print 25% of the ink used for the ink restriction value; in this case, the printing system software would go over the image file and replace every 50% coverage value with 25%. This correction goes on top of that described above for scaling coverage values to the ink restriction value; indeed, both corrections are typically done using a single combined scaling curve.

It is an object of the present invention to provide an improved method and apparatus for determining the ink restriction value.

SUMMARY OF THE INVENTION

According to one aspect of the present invention, there is provided a method of determining, for an ink to be deposited on a substrate by a halftone digital printing process, a nominal coverage value, herein the ink restriction value, that corresponds to an amount of ink sufficient to fully cover the area of the substrate to be printed, the method comprising:
  measuring the reflectance of the printed substrate, at one or more wavelengths, for a range of nominal coverage values, and
  using automatic processing apparatus to determine, from the change of measured reflectance with nominal coverage value, the ink restriction value as the nominal coverage value at which continuous tone behaviour commences.

Advantageously, the ink restriction determination method is used in setting up a printing system for new printing conditions; more particularly, an ink restriction value is determined according to the foregoing method for each ink to be printed, and each ink restriction value is used to set a scaling of nominal coverage values for the ink concerned, this scaling being such that input nominal coverage values are scaled to fit within a range with an upper limit set by the ink restriction value.

The present invention also encompasses apparatus for determining ink restriction values, and a printing system incorporating such apparatus.

BRIEF DESCRIPTION OF THE DRAWINGS

Embodiments of the invention will now be described, by way of non-limiting example, with reference to the accompanying diagrammatic drawings of the prior art and of embodiments of the invention, in which.

BEST MODE FOR CARRYING OUT THE INVENTION

Figure 1:
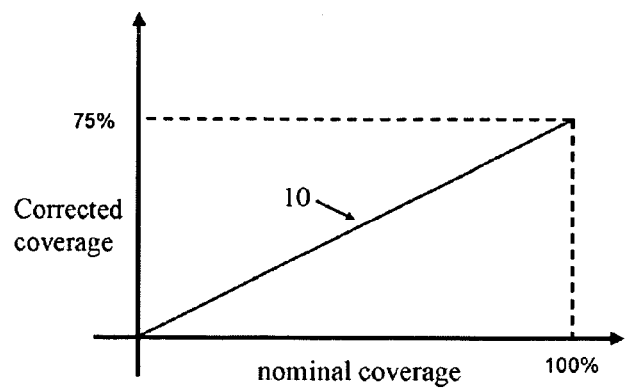
FIG. 1 is a graph illustrating an example prior art scaling curve for mapping nominal ink coverage values to corrected coverage values that do not exceed an ink restriction value.

The thickness of the ink layer in inkjet printing using a halftone process depends on a number of parameters such as:
  Amount of applied ink
  Ink absorption properties of the substrate: the less absorbing the substrate is, the more ink remains on the surface.
  Ink-substrate binding properties: the better is the binding the less ink spreading occurs—more ink remains within a smaller area.

On a typical non-absorbing substrate 20 (see FIG. 2), the behavior of the ink on the surface as the function of amount of applied ink (that is, as a function of coverage), has a three-stage characteristic:
  1. Halftone stage 22: dots of ink are well separated, and the ink layer thickness is uniform. At this stage, the tone is modulated by halftone dot coverage.
  2. Transition stage 23: the halftone dots are fully connected but still are visible; the substrate is almost fully covered. The tone is modulated mainly by nominal halftone dot coverage.
  3. Continuous tone ("contone") stage 24: the substrate is fully covered, dots are not visible, and the ink layer thickness begins to increase. The tone is modulated by changing the ink thickness, i.e. the printing effectively becomes a continuous tone one.

At the beginning of the contone stage all the voids between the halftone dots are already filled in. As the voids have already been filled, additional ink accumulates rather than spreads, causing one or both of the following effects:
  Increased thickness of ink prolongs the drying time and the ink begins to "bleed", i.e. to spread beyond the original image area.
  As the tone is modified by ink thickness and not by the halftone dot size the ability to control the printed colour is very limited, resulting in an uncontrollable colour drifts in high coverage areas.

The contone stage may therefore be considered an undesirable one leading to the conclusion that the ink restriction coverage value should be set to the beginning of the contone stage, i.e. where the actual coverage reaches 100%.

The effect on the light reflection characteristics of a printed substrate of incrementally increasing ink coverage is fundamentally different in the case where the ink layer only partly covers the substrate (the halftone and transition stages of ink behaviour), as compared to the case where the substrate is fully covered by ink (the contone stage of ink behaviour). The ink restriction method described below is based on detecting this difference.

For the halftone and transition stages of ink behavior it is difficult to model the effect on reflectance of increasing ink coverage in a general form as it depends on printer-related factors such as the screening algorithm used, printing head alignments, etc. The contone stage, however, can be characterised physically if the ink layer is likened to a filter with light transmittance varying as the function of the filter thickness. Assuming no scattering within the ink layer, and by Lambert's law (cf see Berns, Roy S. 2000. *Billmeyer and Saltzman's principles of color technology*. John Wiley and Sons, Inc, New York, USA.), the transmittance $T(\lambda)$ of an ink layer of thickness b at wavelength $\lambda$ is:

$$T(\lambda)=t(\lambda)^b \quad (1)$$

where $t(\lambda)$ is the transmittance at wavelength $\lambda$ of an ink layer having unit thickness. For the case of ink on a substrate (that is, considering light has to pass twice through the ink) this translates to a reflectance R at wavelength $\lambda$:

$$R(\lambda)=r(\lambda)t(\lambda)^{2b} \quad (2)$$

where $r(\lambda)$ is the reflectance of the substrate, without the ink, at wavelength $\lambda$. From equation (2) above, and under the assumption that the ink layer thickness is proportional to the nominal halftone coverage value in the "contone" stage being considered, there is a logarithmic relationship between the nominal halftone coverage value and the reflectance. Since optical density at wavelength $\lambda$ is given by:

$$D(\lambda)=-\log_{10}(R(\lambda)) \quad (3)$$

it follows that, in the region where no halftone dots are present and the tone changes only as the result of the change in ink layer thickness, density bears a linear relationship with the nominal halftone coverage value in the image:

$$D_c=\alpha C+\beta \quad (4)$$

where C is the nominal halftone coverage value and $\alpha$ and $\beta$ are constants.

Figure 2:
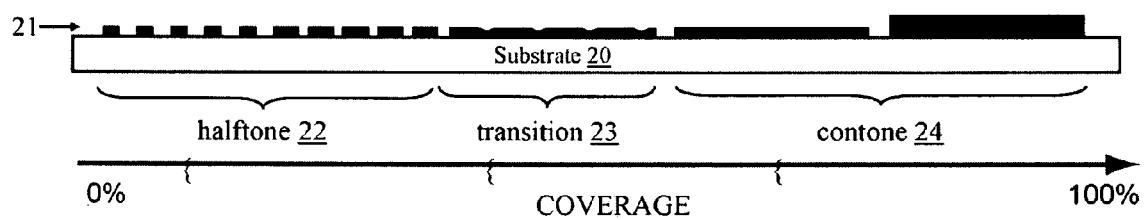
FIG. 2 is a diagram illustrating a the three-stage ink layer model for halftone inkjet printing.
Figure 5:
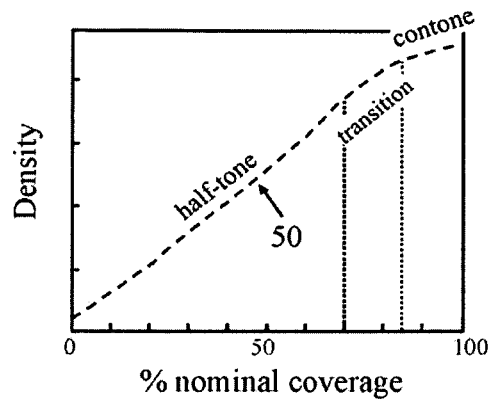
FIG. 5 is a graph showing a plot of optical density as a function of nominal ink coverage for a Cyan ink gradient.

FIG. 5 shows an example density/nominal coverage curve 50; in this example, density was measured on a linear ramp of Cyan ink (solvent, pigment-based) printed on a non-absorbing adhesive substrate using an HP ScitexVision XLJet printer. The three stages of ink behavior illustrated in FIG. 2 are identifiable along the curve 50 in FIG. 5:
  the "halftone" stage between nominal coverages of 0% and ~70%;
  the "transition" stage between nominal coverages of ~70% and ~85%; and
  the "contone" stage between nominal coverages of ~85% and 100% where the curve 50 is substantially linear as predicted by equation (4) above.

In order to determine the ink restriction value for an ink, embodiments of the present invention measure reflectance over printed nominal-coverage gradients, convert the measurements into densities, and then process these density values to determine onset of contone behavior as characterized by equation (4).

Figure 3:
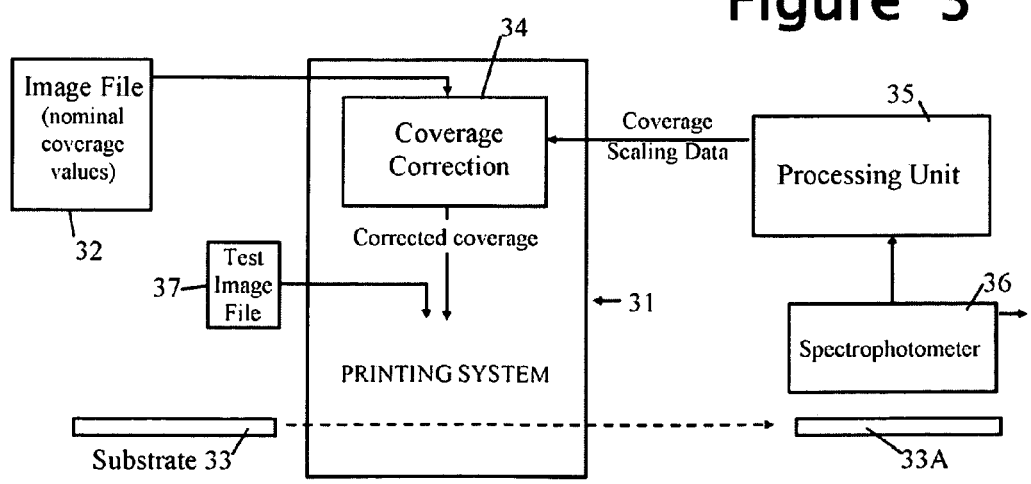
FIG. 3 is a top-level functional block diagram of example apparatus embodying the invention.

Example apparatus embodying the invention is shown in FIG. 3.

In FIG. 3, a printing system 31 is standardly arranged to receive an image file 32 with nominal coverage values and to print the image to a substrate 33 after converting the received nominal coverage values to corrected values in a coverage correction functional block 34 (typically implemented by a processor running appropriate program code). The coverage correction functional block 34 works by using scaling data to translate the nominal coverage values to the corrected values. The scaling data will typically take account not only of ink restriction values but also of 'linearization'.

In addition to the printing system 31, the FIG. 3 apparatus includes a spectrophotometer 36 (or other suitable optical measurement means) for measuring reflectance at different wavelengths, and a processing unit 35 (typically implemented by a processor running appropriate program code). The processing unit 35 and/or the spectrometer 36 can either be stand-alone or built into the printing system 31. The processing unit 35 uses the measurements taken by the spectrometer to automatically generate scaling data appropriate to a given set of print conditions, this scaling data then being passed to the coverage correction functional block 34 of the printing system 31 to set up the printing system for the print conditions concerned.

Figure 4:
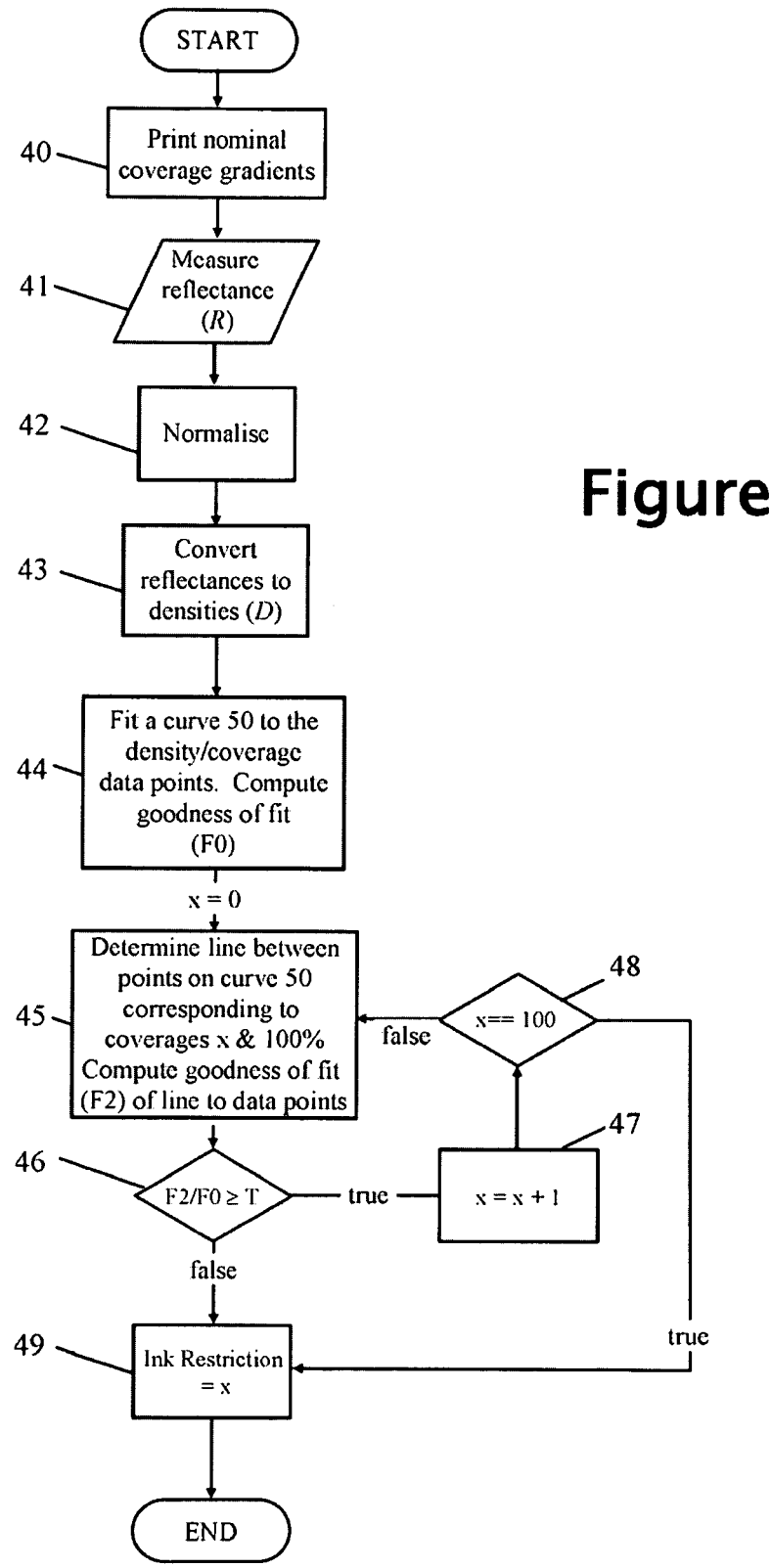
FIG. 4 is a flowchart of an ink restriction determination algorithm implemented by a processing unit of the FIG. 3 apparatus.

FIG. 4 is a flowchart illustrating an example embodiment of the ink restriction determination method of the present invention. This example method is effected using the FIG. 3 apparatus and comprises the following steps:

Step 40 A test image is printed onto substrate 33, this image containing for each ink (e.g. C, Y, M, K) a gradient of nominal coverage values from 0% to 100% (the nominal values in the test image file 37 used to print the test image are not subject to correction by the coverage correction functional block 34).

Step 41 The printed substrate 33A is fed to the spectrometer 36 where the spectral reflectance R of each ink coverage gradient is individually measured over a range of wavelengths. For each ink coverage gradient, this step results in it measurement vectors of size [1, m] where it is the number of measurement locations ('patches') along the gradient, and nm is the number of measurements taken for each patch (the wavelength spacing of the measurements being defined by the spectral resolution of the spectrophotometer). The measurement vectors are passed to the processing unit 35 which then carries out the processing of steps 42 to 49 to determine the ink restriction value for each ink.

Step 42 For each wavelength $\lambda$, the reflectances $R(\lambda)$ of all patches are normalized. This is a two stage process. First the reflectances are normalized to the substrate reflectance $R_{substrate}(\lambda)$, i.e.:

$$R_A(\lambda) = \frac{R(\lambda)}{R_{substrate}(\lambda)} \quad (5)$$

where $R_A(\lambda)$ is the substrate-normalized reflectance.

Then the reflectance of all patches are normalized to the peak reflectance $R_{100\%}$, across all wavelengths, of the patches corresponding to 100% nominal coverage:

$$R_N(\lambda) = \frac{R_A(\lambda)}{\max(R_{100\%})} \quad (6)$$

where $R_N(\lambda)$ is the fully normalized reflectance.

Finally in step 42, for all inks except black, the representative reflectance $r_i$ for each patch (where "i" indicates the $i^{th}$ patch) is chosen to be the value for the wavelength at which the 100% patch has minimum reflectance. For black, the reflectance of the $i^{th}$ patch is set to be the sum of reflectances at all wavelengths:

$$r_{black} = \Sigma R_{block}(\lambda) \quad (8)$$

Step 43 The reflectances r are converted to optical densities D:

$$D = -\log_{10}(r) \quad (9)$$

For each ink, the resultant density values can be plotted against nominal coverage percentage to give a curve of the general form shown in FIG. 5. In the present example method, the processing unit 35 uses the density values to compute an ink restriction value for each ink as set out in steps 44-49 below. The general approach followed is to proceed by increments from 0% through the nominal coverage range and at each increment determine how closely a straight line between the points on the density/coverage curve corresponding to the current coverage value and 100% coverage, matches the corresponding portion of the density/coverage curve—when a threshold goodness-of-fit is reached, it is determined that that the onset of the linear region of the curve corresponding to contone behaviour has been found whereby the coverage value is the ink restriction value sought. In the present example, coverage increments of 1% are used to move through the nominal coverage range from 0% (in the following a variable x is used for the current coverage value, this being initialized to zero)

Steps 44 to 49 proceed as follows for each ink:

Step 44 A curve 50 (see FIG. 6) is fitted to the density/nominal coverage data points and a goodness-of-fit measure F0 is calculated, for example, using the least squares method (for which the lower the value of F0, the better the fit).

Step 45 A straight line is fitted between points on curve 50 corresponding to coverage value x (initially zero) and 100%. A goodness-of-fit measure F2 is determined for the line with respect to density/nominal coverage data points (again, for example, calculated using the least squares method).

Step 46 The ratio of F2 to F0 is compared to a threshold value T—the better the fit of the straight line, the lower the value of the ratio F2/F0. Until a sufficiently close fit is present, the comparison with the threshold T results in a loop back to step 45 via steps 47 and 48; when a sufficiently close fit is present, the comparison with the threshold T results in processing moving to step 49.

Step 47 The value of x is incremented before step 45 is repeated.

Step 48 If the value of x has reached 100, the loop formed by steps 45-48 is exited to step 49.

Figure 6:
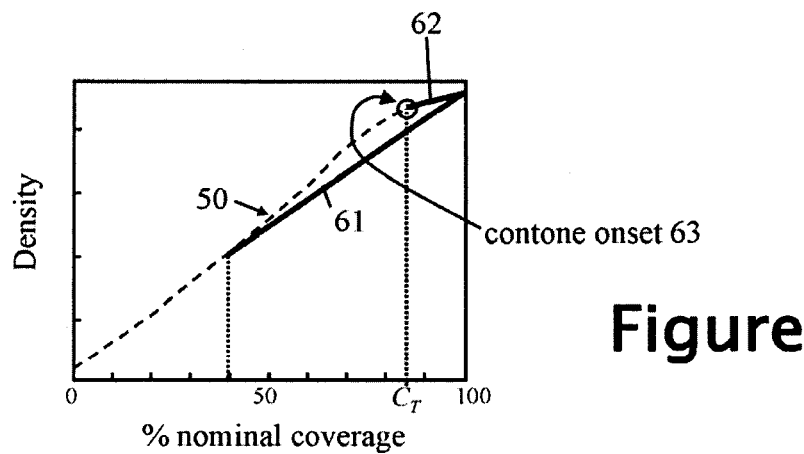
FIG. 6 shows the FIG. 5 graph with the addition of a straight line fitted to the "contone" stage of the curve.

Step 49 The value of x is used as the ink restriction value for the ink concerned. Where step 49 is entered from step 46, the value of x is less than 100 and the general situation is as represented in FIG. 6 by line 62 where the line has resulted in a goodness-of-fit measure F2 giving rise to the ratio F2/F0 matching/crossing the threshold T. The value of x for line 62 is $C_T$ and corresponds to the start of line 62, that is, to the onset 63 of the contone region 51 of the curve 50. Where step 49 is entered from step 48, the value of x is 100 and this occurs only if the onset of contone has not been reached for nominal coverage values less than 100% (effectively, no scaling for ink restriction is needed).

Figure 7:
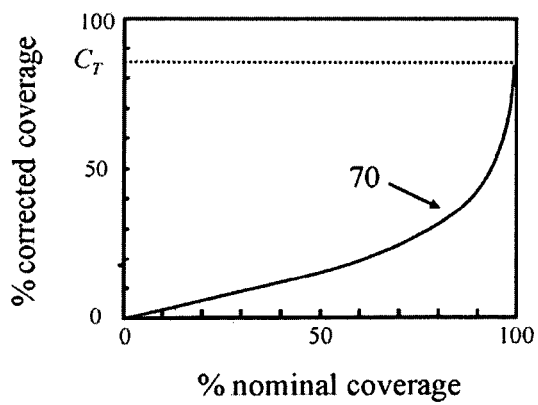
FIG. 7 is a graph illustrating a coverage scaling curve, combining ink restriction and linearisation.

The processing unit 35 can now generate scaling data for passing to the coverage correction functional block 34. Typically, this scaling data will be adjusted, in standard manner, by the processing unit 35 to effect 'linearization' as discussed at the beginning of the present specification. FIG. 7 depicts example scaling data represented as a conversion curve 70 for converting nominal coverage values to corrected coverage values, this curve 70 taking account both of the ink restriction value $C_T$ and linearization.

Application of the above-described method to provide scaling data for an HP Scitex Vision XLJet inkjet printing system printing on glossy non-absorbing adhesive, has provided satisfactory results with visual examination of printed output showing elimination of bleeding in single separation ink layers, and a significant reduction of bleeding in multi-separation layers. The only deviation of the empirical results from the model prediction described above is in the slope of the straight line fitted to the "contone" stage of the curve. This deviation, which does not affect the model's performance, could be due to some unknown physical phenomenon.

The above-described method and apparatus enables ink restriction determination to be effected in a fully automated mode by using reflectance measurements and a processing algorithm that is based on a physical model of ink deposition. The method does not require human intervention and so avoids the problem of subjectivity exhibited by prior-art methods of ink restriction determination.

It will be appreciated that many variants are possible to the above described embodiments of the invention. For example, in steps 45 to 49 rather than incrementally increasing the coverage x from 0% until either the 100% value is reached or the fit of the line 61 to the data points has improved at least to the level of goodness represented by the threshold T, it is alternatively possible to incrementally decrease the value of x from 100% until either the 0% value is reached or the fit of the line 61 to the data points falls to or below the level of goodness represented by the threshold. Furthermore, where experience with a particular printing system shows that the ink restriction value is always bounded by one or both of a lower limit greater than 0% nominal coverage value and an upper limit less 100% nominal coverage value, then the reflectance measurements and their subsequent processing can be restricted by such bounds.

Normalization, while preferred, is optional as is the use of the F0 goodness-of-fit measure. The goodness-of-fit measure F2 can be relative to the density/coverage curve itself rather than relative to the data points from which the curve was derived.

Whereas it is preferred to measure reflectance over a range of wavelengths as this makes the method adaptive to a range of ink colours, for a known ink it would be possible to measure reflectance at a single wavelength substantially corresponding to the representative wavelength referred to in step 42 at which the 100% patch has minimum reflectance; for example, this latter wavelength could be determined first using a 100% nominal coverage patch, and then reflectance measured at this wavelength for the full range of nominal coverage values.

In another variant, for each coverage value x reflectance is measured at multiple different wavelengths and the processing unit 35 is arranged to derive an average measured reflectance across the measurement wavelengths. The processing unit 35 then determines the ink restriction from the change of the average measured reflectance with nominal coverage value.

Furthermore, it will be appreciated that while generally the measurement wavelength(s) will lie in the optical spectrum, this is not necessarily the case (for example, inks reflecting light in the IR and UV ranges might be used).

Although the determination of the ink restriction value has been described above in the context of determining scaling data for correcting input nominal coverage values in a printing system, the present invention is not limited to any particular context.

The invention claimed is:

1. A method of determining, for an ink to be deposited on a substrate by a halftone digital printing process, a nominal coverage value, herein the ink restriction value, that corresponds to an amount of ink sufficient to fully cover the area of the substrate to be printed, the method comprising:
   measuring the reflectance of the printed substrate, at one or more wavelengths, for a range of nominal coverage values,
   converting the reflectance measurements to optical density values, and
   using an automatic processing arrangement to determine, from the change of measured reflectance with nominal coverage value, the ink restriction value as the nominal coverage value at which continuous tone behaviour commences, the nominal coverage value at which continuous tone behaviour commences being determined by the automatic processing arrangement based on a dependency of the optical density values on the nominal coverage values.

2. A method according to claim 1, wherein the nominal coverage value at which continuous tone behaviour commences are determined by the automatic processing arrangement as the lower end point of a high-end linear dependency of optical density on nominal coverage.

3. A method according to claim 1, wherein the maximum nominal coverage value of said range is 100%.

4. A method according to claim 1, wherein for each nominal coverage value of said range, reflectance is measured at multiple different wavelengths, the reflectance measurements being normalized to both the substrate reflectance, and the peak reflectance across all wavelengths for maximum nominal coverage value of said range.

5. A method according to claim 1, wherein for each nominal coverage value of said range, reflectance is measured at multiple different wavelengths, the method further comprising determining the measurement wavelength at which reflectance is a minimum for the maximum nominal coverage value of said range; the automatic processing arrangement determining the ink restriction from the change of measured reflectance with nominal coverage value at said measurement wavelength at which reflectance is a minimum for the maximum nominal coverage value.

6. A method according to claim 1, further comprising determining the wavelength at which reflectance is a minimum for the maximum nominal coverage value of said range; the measuring of the reflectance of the printed substrate for a range of nominal coverage values, being effected only at the wavelength for which it has been determined that reflectance is a minimum for the maximum nominal coverage value.

7. A method according to claim 1, wherein for each nominal coverage value of said range, reflectance is measured at multiple different wavelengths, the automatic processing arrangement determining the ink restriction from the change of the average measured reflectance with nominal coverage value at said measurement wavelengths.

8. A printing-system set-up method in which, for each new set of printing conditions, an ink restriction value is determined for each ink to be printed, each determination being effected in accordance with the method of claim 1; and each ink restriction value being used to set a scaling of nominal coverage values for the ink concerned, this scaling being such that input nominal coverage values are scaled to fit within a range with an upper limit set by the ink restriction value.

9. A method of determining, for an ink to be deposited on a substrate by a halftone digital printing process a nominal coverage value herein the ink restriction value, that corresponds to an amount of ink sufficient to fully cover the area of the substrate to be printed, the method comprising:
- measuring the reflectance of the printed substrate at one or more wavelengths for a range of nominal coverage values, and
- using an automatic processing arrangement to determine, from the change of measured reflectance with nominal coverage value, the ink restriction value as the nominal coverage value at which continuous tone behaviour commences, wherein the automatic processing arrangement effects its determination of the ink restriction value by:
  - converting the measured reflectance values to optical density values to form a set of data points each comprising an optical density value and a corresponding nominal coverage value;
  - fitting a curve to the data points; and
  - repeating, for successive nominal coverage values incrementally changing through said range from a starting value, until either the end of the range is reached or the commencement of continuous tone behaviour has been determined:
  - deriving a straight line between points on said curve corresponding to the current nominal coverage value and the maximum nominal coverage value of said range;
  - deriving a first goodness-of-fit value in respect of the fit of the straight line to the corresponding portion of the curve or the underlying data points; and
  - comparing the first goodness-of-fit value to a predetermined threshold to determine the commencement of continuous tone behaviour.

10. A method according to claim 9, wherein successive nominal coverage values incrementally increase in value, the commencement of continuous tone behaviour being determined to have occurred upon the comparison of the first goodness-of-fit value to said predetermined threshold indicating that the fit of the straight line to the corresponding portion of the curve or the underlying data points has improved at least to a level of goodness represented by the threshold.

11. A method according to claim 9, wherein successive nominal coverage values incrementally decrease in value, the commencement of continuous tone behaviour being determined to have occurred upon the comparison of the first goodness-of-fit value to said predetermined threshold indicating that the fit of the straight line to the corresponding portion of the curve or the underlying data points has fallen to or below a level of goodness represented by the threshold.

12. A method according to claim 9, wherein a second goodness-of-fit value is derived in respect of the fit of the curve to the data points, the first goodness-of-fit value being divided by the second goodness-of-fit value for comparison with said threshold.

13. A method according to claim 9, wherein the maximum nominal coverage value of said range is 100%.

14. A method according to claim 9, wherein for each nominal coverage value of said range, reflectance is measured at multiple different wavelengths, the reflectance measurements being normalized to both the substrate reflectance, and the peak reflectance across all wavelengths for maximum nominal coverage value of said range.

15. Apparatus for determining, for an ink to be deposited on a substrate by a halftone inkjet printing process, a nominal coverage value, herein the ink restriction value, that corresponds to an amount of ink sufficient to fully cover the area of the substrate to be printed, the apparatus comprising:
- an optical measurement arrangement for measuring the reflectance of the printed substrate, at one or more wavelengths, for a range of nominal coverage values, and
- an automatic processing arrangement that converts the reflectance measurements to optical density values and determines, from the change of measured reflectance with nominal coverage value, the ink restriction value as the nominal coverage value at which continuous tone behaviour commences, the nominal coverage value at which continuous tone behaviour commences being determined by the automatic processing arrangement based on a dependency of the optical density values on the nominal coverage values.

16. Apparatus according to claim 15, wherein the nominal coverage value at which continuous tone behaviour commences are determined by the processing arrangement as the lower end point of a high-end linear dependency of optical density on nominal coverage.

17. Apparatus according to claim 15, wherein the maximum nominal coverage value of said range is 100%.

18. Apparatus according to claim 15, wherein for each nominal coverage value of said range, the optical measurement arrangement is arranged to measure reflectance at multiple different wavelengths, the processing arrangement being arranged to normalize the reflectance measurements to both the substrate reflectance, and the peak reflectance across all wavelengths for maximum nominal coverage value of said range.

19. Apparatus according to claim 15, wherein for each nominal coverage value of said range, the optical measurement arrangement is arranged to measure reflectance at multiple different wavelengths, the automatic processing arrangement being arranged to determine the measurement wavelength at which reflectance is a minimum for the maximum nominal coverage value of said range, and to determine the ink restriction from the change of measured reflectance with nominal coverage value at said measurement wavelength at which reflectance is a minimum for the maximum nominal coverage value.

20. A printing system including the apparatus of claim 15 and a correction arrangement for correcting, for each ink used, input nominal coverage values using pre-determined scaling data, the automatic processing arrangement being arranged to generate said scaling data in dependence on the ink restriction value determined by said apparatus for the ink concerned.

21. Apparatus for determining, for an ink to be deposited on a substrate by a halftone inkjet printing process, a nominal coverage value herein the ink restriction value, that corresponds to an amount of ink sufficient to fully cover the area of the substrate to be printed, the apparatus comprising:
- an optical measurement arrangement for measuring the reflectance of the printed substrate, at one or more wavelengths, for a range of nominal coverage values, and
- an automatic processing arrangement for determining, from the change of measured reflectance with nominal coverage value, the ink restriction value as the nominal coverage value at which continuous tone behaviour commences, wherein the automatic processing arrangement is arranged to effect its determination of the ink restriction value by:

converting the measured reflectance values to optical density values to form a set of data points each comprising an optical density value and a corresponding nominal coverage value;

fitting a curve to the data points; and repeating, for successive nominal coverage values incrementally changing through said range from a starting value, until either the end of the range is reached or the commencement of continuous tone behaviour has been determined:

deriving a straight line between points on said curve corresponding to the current nominal coverage value and the maximum nominal coverage value of said range;

deriving a first goodness-of-fit value in respect of the fit of the straight line to the corresponding portion of the curve or the underlying data points; and comparing the first goodness-of-fit value to a predetermined threshold to determine the commencement of continuous tone behaviour.

22. Apparatus according to claim 21, wherein the automatic processing apparatus is arranged to incrementally increase said successive nominal coverage values, and to determine the commencement of continuous tone behaviour to have occurred upon the comparison of the first goodness-of-fit value to said predetermined threshold indicating that the fit of the straight line to the corresponding portion of the curve or the underlying data points has improved at least to a level of goodness represented by the threshold.

23. Apparatus according to claim 21, wherein the automatic processing apparatus is arranged to incrementally decrease said successive nominal coverage values, and to determine the commencement of continuous tone behaviour to have occurred upon the comparison of the first goodness-of-fit value to said predetermined threshold indicating that the fit of the straight line to the corresponding portion of the curve or the underlying data points has fallen to or below a level of goodness represented by the threshold.

24. Apparatus according to claim 21, wherein the automatic processing arrangement is further arranged to derive a second goodness-of-fit value in respect of the fit of the curve to the data points, and to divide the first goodness-of-fit value by the second goodness-of-fit value for comparison with said threshold.

25. Apparatus according to claim 21, wherein for each nominal coverage value of said range, the optical measurement arrangement is arranged to measure reflectance at multiple different wavelengths, the processing arrangement being arranged to normalize the reflectance measurements to both the substrate reflectance, and the peak reflectance across all wavelengths for maximum nominal coverage value of said range.

* * * * *

UNITED STATES PATENT AND TRADEMARK OFFICE
CERTIFICATE OF CORRECTION

PATENT NO. : 8,687,236 B2  
APPLICATION NO. : 12/357581  
DATED : April 1, 2014  
INVENTOR(S) : Boris Oicherman et al.

Page 1 of 1

It is certified that error appears in the above-identified patent and that said Letters Patent is hereby corrected as shown below:

In the Claims:

In column 9, line 2, in Claim 9, delete "process" and insert -- process, -- therefor.

In column 9, line 3, in Claim 9, delete "value" and insert -- value, -- therefor.

In column 9, line 6, in Claim 9, delete "substrate" and insert -- substrate, -- therefor.

In column 9, line 7, in Claim 9, delete "wavelengths" and insert -- wavelengths, -- therefor.

In column 10, line 55, in Claim 21, delete "value" and insert -- value, -- therefor.

Signed and Sealed this  
Fifth Day of August, 2014

Michelle K. Lee  
*Deputy Director of the United States Patent and Trademark Office*